INVENTORS
ROBERT E. RUSSELL
EUGENE S. McVEY
BY
Oberlin, Maky & Donnelly
ATTORNEYS

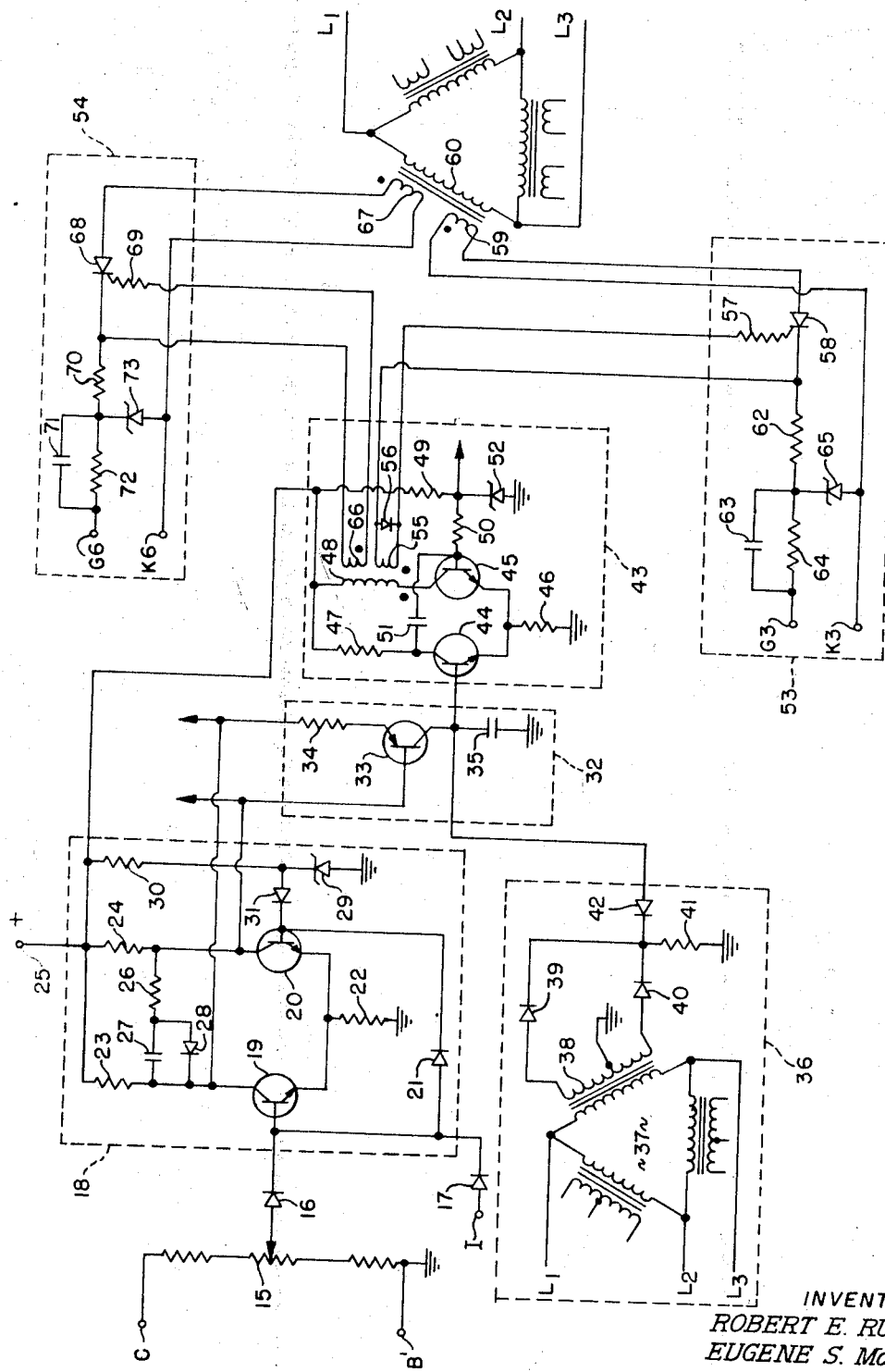

United States Patent Office 3,447,061
Patented May 27, 1969

3,447,061
MULTI-PHASE RECTIFIER WITH INHERENT PHASE BALANCE
Robert E. Russell and Eugene S. McVey, Charlottesville, Va., assignors to Basic, Incorporated, Cleveland, Ohio, a corporation of Ohio
Filed July 12, 1965, Ser. No. 471,241
Int. Cl. H02m 1/08
U.S. Cl. 321—5     3 Claims

ABSTRACT OF THE DISCLOSURE

A multiple phase SCR rectifier circuit having width modulated gate signals for triggering the SCR's to provide a constant output voltage or current, either output being compared to a reference signal by a differential amplifier to produce various phase ramp function voltages having a slope which determines the triggering time of the SCR's. In complementary phases attainment of a particular voltage level of the ramp generator signal is detected and converted to a pulse output at appropriate times within the power cycles. The circuit is characterized in that it is not influenced by variations in semi-conductor parameters or by drifting voltages utilizing a floating error signal control of the ramp signal generators.

---

Figure 1:
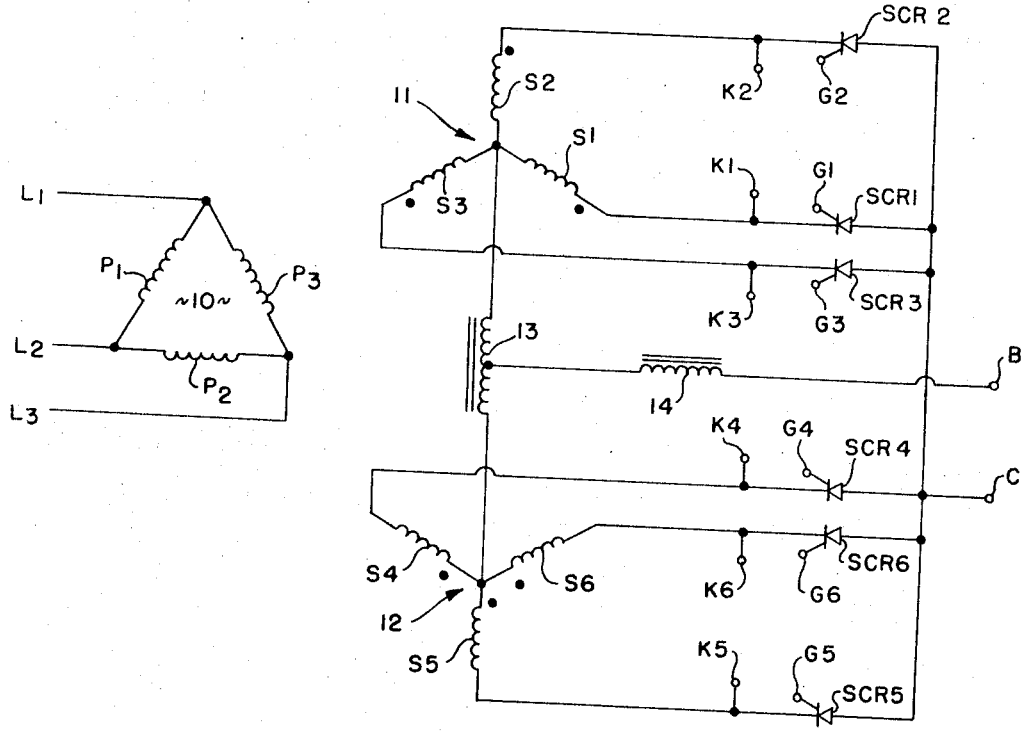

This invention relates to a system for converting multiple phase alternating current to regulated direct current and, more particularly, to an improved solid state converter of this type.

Systems for effecting such conversion through the utilization of solid state components are being increasingly used in industry in view of certain inherent physical and operational advantages of this type of component as compared to those used in the older and more conventional forms of converter. For example, a solid state system requires considerably less space, is lighter in weight, and maintenance demands are noticeably less than those of the usual tube or rotary type of converter. Moreover, with regard to operational characteristics, the solid state components have relatively much shorter time constants and can, therefore, maintain the desired close regulation of the converter output notwithstanding rapidly changing input and load conditions.

It is primarily intended by the present improvements to provide a solid state converter for multi-phase operation which, in addition to the above known inherent advantages, is more easily employed and more stable in its operation.

One factor which could adversely affect performance of the converter is temperature, and a more particular further object of the invention is to provide a solid state system for the indicated conversion which is greatly improved in respect of temperature stability.

Another object of the present invention is to provide a multi-phase solid state conversion system which does not require the adjustment for balancing of the individual phases necessarily present in conventional systems. In the preferred embodiment of the invention, only two adjustments are required to be made for operation of the new converter, whereas other multi-phase systems currently in use require at least three adjustments for balancing of the phases in addition to establishing the usual voltage and current controls.

It is also an object of the invention to provide a converter of the indicated class in which there is a control section employing semiconductor components and passive components in such circuit arrangements that phase balance is a function of the latter rather than the parameters of the former and the easily realized control of the tolerance of the passive components eliminates the need for separate balancing adjustments.

Another object of the present invention is to provide a multi-phase solid state converter which costs less and requires fewer components than currently available systems of comparable utility.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Other objects and advantages of the present invention will become apparent as the following description proceeds.

Figure 3:
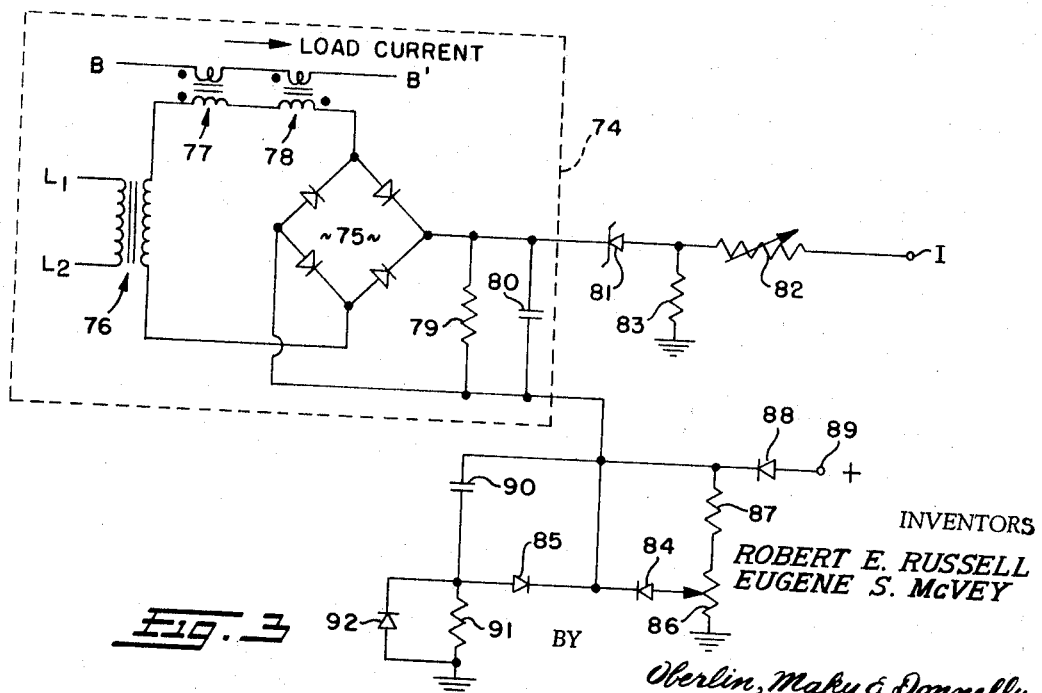

In said annexed drawings:
FIG. 1 is a wiring diagram of the power section of the new converter;
FIG. 2 is a diagram of the converter control section; and
FIG. 3 is a current limiting and starting circuit for the converter.

Referring now to the drawings in detail, it will be evident from the above brief descriptions that the new converter comprises in combination the power, control, and current limiting sections respectively shown in the figures in the same order. The system has thus been divided in its illustration for convenience and ease of understanding, and the manner in which the several sections are interconnected has been indicated by the application of corresponding reference characters to common terminals, as will appear more clearly from the following description.

With regard, then, to the converter power section of FIG. 1, the circuit thereof includes a delta connected primary 10 in a three phase alternating current supply represented by the line conductors L1, L2, and L3, with such primary arrangement desired for suppression of third harmonic currents in the supply. The supply transformer is completed by two three-phase Y secondaries 11 and 12 interconnected at their respective center terminals through a usual interphase transformer 13. The secondary accordingly forms a six-phase double-Y circuit.

In the primary 10, the three windings are marked P1, P2 and P3, respectively for identification with the three phases of the supply. With the same identifying significance, the windings of the secondary 11 are marked S1, S2 and S3 while those of the secondary assembly 12 are designated S4, S5 and S6, thereby indicating the six secondary phases. The secondary windings S1, through S6 are connected respectively to silicon controlled rectifiers SCR1 to SCR6, inclusive, with corresponding numerals used for the associated pairs of windings and rectifiers. The several such rectifiers are commonly connected, at their other sides, to an output terminal C, while the other output terminal B is connected through a filtering inductor 14 to a center tap on the interphase transformer 13. In the event that additional filtering is required or desired, such as for a primarily resistive load, a capacitor can be added between the output terminals.

The output voltage at such terminals is controlled by delaying conduction of the silicon controlled rectifiers in appropriate manner, and this is accomplished in the illustrated power section by providing properly phased and width modulated gate signals to such rectifiers. The gate signals are applied to the rectifiers SCR1–SCR6 between the terminals marked G1–G6, for gate, and K1–K6, for cathode, respectively. The control pulses to the gates of the power rectifiers are supplied by the control circuit illustrated schematically in FIG. 2. This control circuit as here shown provides gate signal generation for only two complementary phases, with the circuits for the remaining phases being identical and omitted for convenience without any loss of full and proper understanding of the section.

The power section of FIG. 1 provides a portion of the supply output to terminals C and B' across a voltage divider 15 having connection to a diode 16. An input at the terminal I, which is derived in a manner to be explained in the following, is applied to a parallel diode 17, and the two diodes 16 and 17 are connected to provide an input to a comparator and amplifier shown within the box formed by the dashed outline 18. The input to this comparator and amplifier, only one of which is required for all phases, is selected by the diodes 16 and 17 as the greater of that portion of the supply output determined by the voltage divider 15 and the input at the terminal I. The amplifier receiving the thus selected input, is, more specifically, a differential amplifier comprising two NPN type transistors 19 and 20. The cathode of the diode 16 is connected in parallel with the cathode of diode 17 to the base of transistor 19 and, through diode 21, to the base of transistor 20. The emitters of these two transistors are commonly connected through a resistor 22 to ground, while their collectors are respectively connected through resistors 23 and 24 to a source of direct current voltage at the terminal 25. Between the collectors of the two transistors, there is a network comprising resistor 26 and, in series therewith, a capacitor 27 and diode 28, in parallel.

The selected input to the differential amplifier is compared therein with a reference voltage derived from a Zener diode 29 connected between the terminal 25 and ground through a resistor 30 and, at its cathode side, through a diode 31 to the base of the transistor 20. The voltage difference resulting from this comparison is amplified and appears between the collectors of the transistors 19 and 20, with the noted capacitor 27 and resistor 26 being provided to control the frequency response of the amplifier and provide compensation for the closed loop system.

The amplified difference voltage from the comparator and amplifier is supplied to three saw-tooth ramp generators, only one of which is shown as within the dashed outline 32, with the arrows indicating such other generator connections. This generator comprises a PNP type transistor 33, and the difference voltage is applied as illustrated across the base and emitter of transistor 33, the latter having in its circuit a resistor 34. A capacitor 35 receives the output from the collector of the transistor 33, and this output will be a linearly increasing voltage across the capacitor of a slope proportional to the differential error voltage. The saw-tooth voltages are synchronized to each phase by synchronizing circuits, such as the one shown within the dashed outline 36 and comprising a delta primary 37 energized by the three phase line conductors L1, L2 and L3. The primary windings are respectively coupled with secondary windings having grounded center taps, with each such secondary serving two complementary phases. Only one secondary winding 38 is shown in complete circuit, since, as earlier noted, only two phases are being fully illustrated and these will, of course, be the same two phases served by the sawtooth ramp generator 32.

In this synchronizing circuit, the winding 38 has a center ground and its ends connected to diodes 39 and 40 at the anodes thereof. The cathodes of the diodes 39 and 40 are commonly connected through a resistor 41 to ground, and to the cathode of a diode 42 the anode of which is connected between the collector of the transistor 33 of the saw-tooth ramp generator and the output capacitor 35. It will be understood that such synchronizing circuit causes the capacitor 35 to discharge at the beginning of each half-cycle of the appropriate phase voltage.

Upon reaching a specified voltage, the saw-tooth ramp triggers a regenerative pulse generator enclosed by the dashed outline 43. This generator comprises two NPN transistors 44 and 45 having their emitters grounded commonly through a resistor 46. The saw-tooth ramp generator is connected to the base of the transistor 44, the collector of which is connected through a resistor 47 to the direct current voltage supply at the terminal 25. The collector of the transistor 45 is connected to the same source through a transformer winding 48 in parallel with resistors 49 and 50 through the collector and base of the transistor 45. Capacitor 51 is connected between the base of transistor 45 and the collector of transistor 44, while a Zener diode 52 is connected at its cathode through the noted resistor 50 to the base of the transistor 45 and, at its anode, to ground. The Zener diode 52 thus provides the trigger level for the pulse generator and will serve all phases in this manner, the arrow indicating connection to the phase pulse generators not shown. The complete control section will comprise two additional pulse generators, and the three are each isolated from the rest of the control circuit by the pulse transformers.

The pulses from the pulse generator 43 are supplied to two gate signal generators respectively within the dashed outlines 53 and 54 for the two complementary phases considered with 180° phase difference. The gate signal generator 53 for one of these phases receives its pulses through the secondary winding 55 of the pulse transformer, with a diode 56 connected across this secondary. One end of the pulse transformer winding 55 is connected through a resistor 57 to the gate of a small silicon controlled rectifier 58, the cathode of which is connected to the other end of the winding 55. The anode of rectifier 58 is connected to one end of a secondary transformer winding 59 coupled to one phase winding 60 of a delta primary energized by the line conductors L1, L2 and L3. The other end of the secondary winding 59 is connected to the cathode terminal K3 of SCR3, while the cathode of the rectifier 58 is connected through a resistor 62 and a parallel capacitor 63 and resistor 64 to the gate terminal G3 of the same silicon controlled rectifier SCR3. A Zener diode 65 is connected as shown across this input circuit to the terminals G3, K3, and the output of the gate signal generator is a width modulated pulse which is derived from the appropriate phase power line voltages.

The gate signal generator 54 for the complementary phase considered receives its pulses from a pulse transformer secondary winding 66 also coupled to the primary 48 in the pulse generator circuit 43. This further gate signal generator corresponds to the one first described, with generator 54 comprising a line transformer secondary winding 67 also coupled to the primary 60, with its ends respectively connected to a small silicon controlled rectifier 68 and cathode terminal K6. The pulse transformer winding 66 is connected across the gate and cathode of a further small silicon controlled rectifier 68 with a resistor 69 in the circuit as shown. The cathode of rectifier 68 is connected to the terminal G6 through resistor 70 and capacitor 71 and resistor 72 in parallel, with a further Zener diode 73 in such input to these gate terminals.

In the line transformer 61, in which the windings 59, 60 and 67 have been designated, each of the other primary windings serves two secondary windings for the remaining complementary pairs of gate signal generators. The complete control section, in all phases, will accordingly include four additional gate signal generators in the same relation.

The auxiliary input at the terminal I of the power section as previously noted is used to control this section during current limited operation and for turn-on of the converter, with FIG. 3 illustrating the source of this input. Such current limiting section comprises a magnetic amplifier shown enclosed by the dashed outline 74 and including a bridge rectifier 75. The bridge circuit is energized by transformer 76 receiving line voltage and transformers 77 and 78 responsive to the converter load current, whereby the magnetic amplifier provides a voltage which will be proportional to such load current. A resistor 79 and capacitor 80 are connected across the output terminals of the bridge 75, with one side further connected to the cathode of a Zener diode 81 the anode of which is connected through a variable resistor 82 to the terminal I, a shunt resistor 83 to ground being provided between the diode and the resistor 82. The other side of the bridge output is connected commonly to the cathodes of two additional diodes 84 and 85. The anode of diode 84 is connected to a wiper of a potentiometer 86 connected with a series resistor 87 and diode 88 between a source of direct current voltage 89 and ground. The cathode of diode 88 is also connected through a capacitor 90 to the anode of the diode 85, with an intermediate register 91 and parallel diode 92 to ground.

The voltage proportional to the converter load current produced by the magnetic amplifier circuit is added to the fixed voltage at the wiper of the potentiometer 86. The sum voltage is reduced by the Zener diode 81 and passes through the variable resistor 82, which provides gain adjustment, to become the current limit output voltage at the terminal I. When the converter output current is such that the voltage at the terminal I is greater than the voltage control loop input at the divider 15 (FIG. 2), then the converter output is controlled by the output current or, in other words, the converter changes from a constant voltage operation to constant current operation. The point at which the converter thus becomes a constant current supply is determined by the voltage set at the wiper of the potentiometer 86.

As earlier noted, the operation of this circuit is such that the output current is controlled during turn-on of the system. Before power is applied, there will be no charge on the capacitor 90 in the FIG. 3 converter section, and when the converter is turned on, this capacior begins to charge through resistors 83 and 91, whereby a voltage decreasing with time appears across the resistor 91. This voltage, which is initially greater than the voltage at the wiper of the potentiometer 86, is summed with the voltage from the magnetic amplifier through the diode 85 and, as the voltage across the resistor 91 decreases, the magnetic amplifier voltage and hence the output current can correspondingly rise to the value required by the converter load. The voltage across resistor 91 drops below the voltage at the wiper of the potentiometer 86, whereby diode 85 ceases to conduct, while diode 84 conducts and the current limiting circuit is restored to regular operation. The further diode 92 assists in discharge of the capacitor 90 when power is removed from the circuit. The diode 88 serves to isolate this circuit from the source of voltage 89 if such source should fail, the source 89 being the same as the previously noted source 25.

With further regard to that portion of the control section of FIG. 2 comprising the differential amplifier and the saw-tooth generators, only one of the latter being shown as explained, it will be noted that the differential voltage between the collectors of the transistors 19 and 20 of the amplifier is used as the signal to the saw-tooth generators. This is in contrast to the usual manner of connection of a differential amplifier by which it is operated in a single-ended manner with only one collector voltage used for the error signal. The different connection noted in the new converter control section is considered more advantageous in that it utilizes fully the inherent stability of the differential amplifier and the effect of a change in the saw-tooth ramp generator transistors as a result of changing temperature is greatly reduced. Accordingly, the temperature stability of the combined differential amplifier-comparator and saw-tooth generator portion of the disclosed system is considerably better than has been realized with other modes of connection.

As also noted previously, the new converter is designed to eliminate any requirement for adjustment to balance the individual phases, and it will be seen that the saw-tooth ramp generators, the pulse generators, and the gate signal generators, in the repeated portions of the control section comprise circuits the operations of which are independent of their semiconductor parameters. The balance between the phases is therefore a function only of the passive components, not the semiconductor parameters which may vary widely, and the tolerance of such passive components can be easily controlled. As a result, the operation of the new convertor requires only two adjustments, to control the output voltage and the current limit. Other multi-phase systems now used depend significantly upon component parameters which cannot be readily controlled and most require at least three additional adjustments for phase balancing.

It will also be appreciated that the noted areas of improvement in a solid state converter are realized according to this disclosure with a relatively small number of components, and the converter is of simplified and inexpensive form. Such converter, nevertheless, incorporates protection for both the converter and the load from the effects of excessive overload and transients during turn-on, steady state operation, and following power line interruptions. Moreover, if desired, the output can be made a function of the input by substitution of a low power signal for the system reference and, when operated in this manner, the system is a servo-amplifier with a large power gain.

Other modes of applying the principle of the invention may be employed, change being made as regards the details described, provided the features stated in any of the following claims or the equivalent of such be employed.

We, therefore, particularly point out and distinctly claim as our invention:

1. In a solid state converter, an amplifier circuit for comparing an input voltage with a reference voltage to produce an amplified difference voltage as an error signal, a power section operative to provide a first such input voltage from a portion of the converter output, a current limiting section operative to provide a second such input voltage proportional to the converter load current, circuit means for comparing said first and second input voltages and applying the greater such voltage to said amplifier circuit, the amplifier including a pair of transistors having a common emitter connection to form a differential amplifier, a saw-tooth ramp generator comprising a further transistor, and connections between both collectors of the amplifier transistors and the saw-tooth generator transistor for producing a linearly increasing voltage at a slope proportional to said error signal.

2. In a solid state converter for multiple phases, including amplifier and comparator means for developing an error signal, saw-tooth ramp generators for the various phases connected to receive said error signal and produce linearly varying voltages at a slope proportional to the error signal, a corresponding number of pulse generators for receiving the voltages produced by the ramp generators, a common reference voltage source for said pulse generators, gate signal generators for each phase, the gate signal generators for complementary phases being connected to one of the pulse generators, and silicon controlled rectifiers respectively in the power phases regulated by operation of said gate signal generator, with all active components of the ramp, pulse and gate signal generators being semi-conductors.

3. In a solid state converter of the type wherein regulation of the output of the converter is attained by controlling the triggering time of a silicon controlled rectifier, a circuit for such control, comprising first and second transistors energized from a source of DC voltage and having base and collector electrodes and emitter electrodes interconnected in a differential amplifier configuration, means for applying a variable voltage signal representative of the output of the conveter to the base electrode of said first transistor, means for applying a fixed reference voltage to the base electrode of said second transistor, an impedance element in the collector circuit of each of said first and second transistors for developing a floating electrical signal between the collector electrodes, such signal being representative of the error of the converter, a capacitor for developing a ramp voltage for triggering of the silicon controlled rectifier, a third transistor for charging said capacitor, said third transistor having base and emitter electrodes and a collector electrode connected to said capacitor, and means connecting the collectors of said first and second transistors to the base and emitter electrodes of said third transistor thereby to charge said capacitor and develop the ramp voltage independently of component and DC source voltage variations.

References Cited

UNITED STATES PATENTS

| | | | |
|---|---|---|---|
| 3,123,761 | 3/1964 | Greene | 321—18 XR |
| 3,134,068 | 5/1964 | Feltman | 321—5 XR |
| 3,214,672 | 10/1965 | Watkins | 321—16 |
| 3,237,082 | 2/1966 | Heller et al. | 321—18 |
| 3,260,919 | 7/1966 | Kleiner | 321—18 |
| 3,310,730 | 3/1967 | Ruch | 321—18 |
| 3,323,037 | 5/1967 | Doss | 321—18 |
| 3,343,062 | 9/1967 | Mesenhimer | 321—18 XR |
| 3,351,838 | 11/1967 | Hunter | 321—5 |

JOHN F. COUCH, *Primary Examiner.*

W. M. SHOOP, JR., *Assistant Examiner.*

U.S. Cl. X.R.

321—18, 47